UNITED STATES PATENT OFFICE.

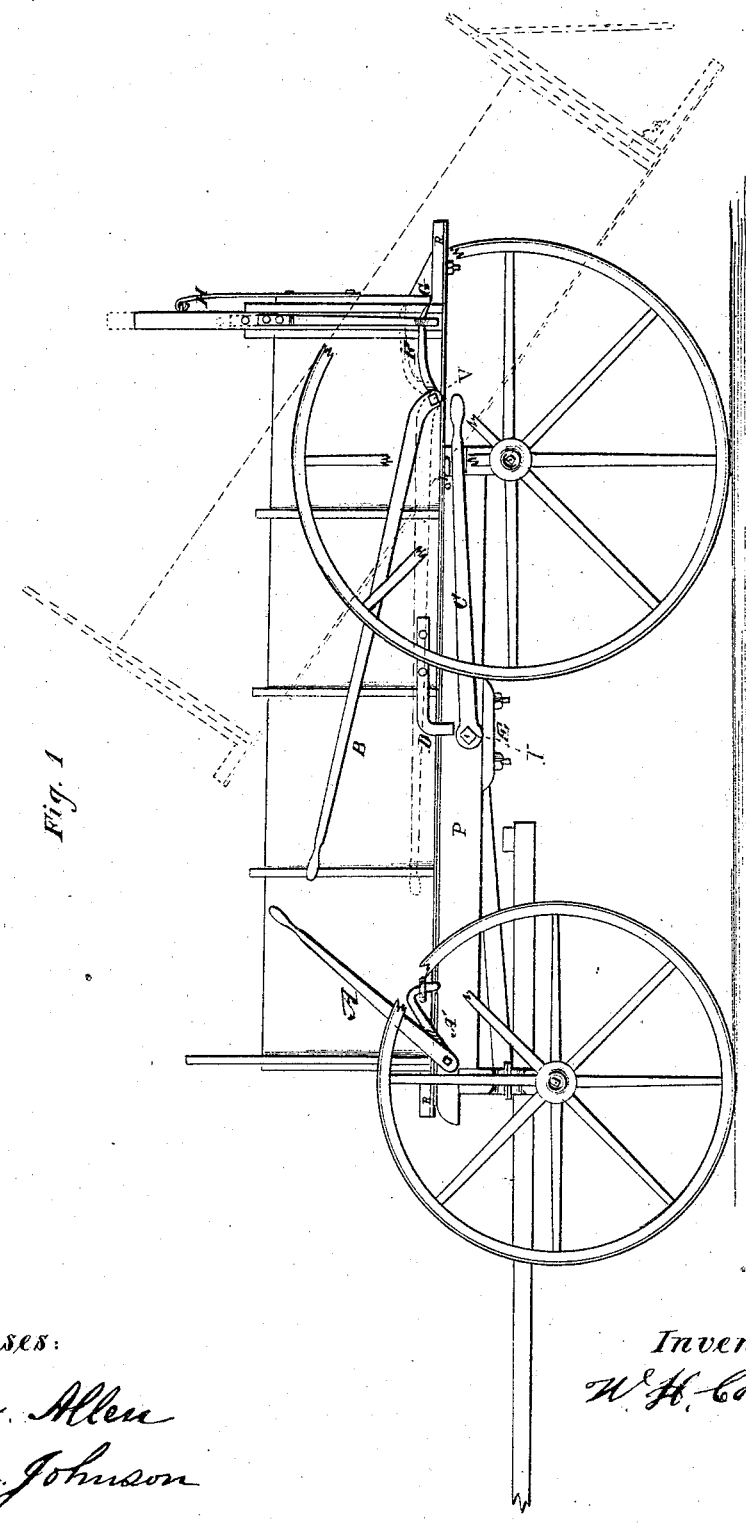

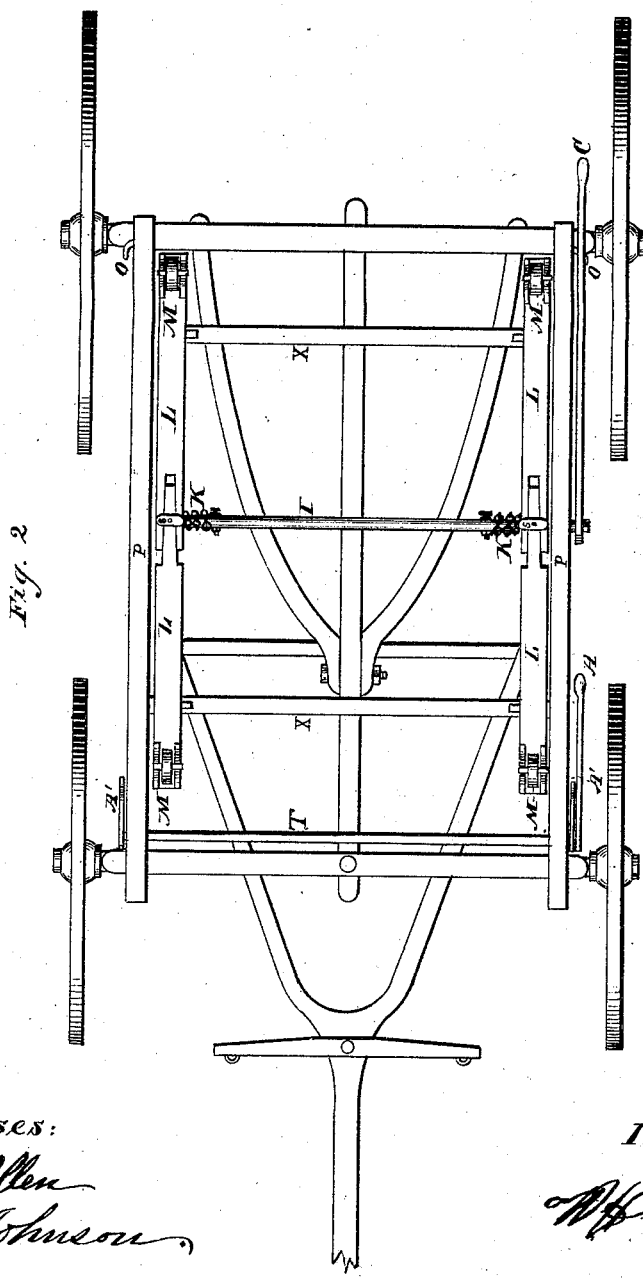

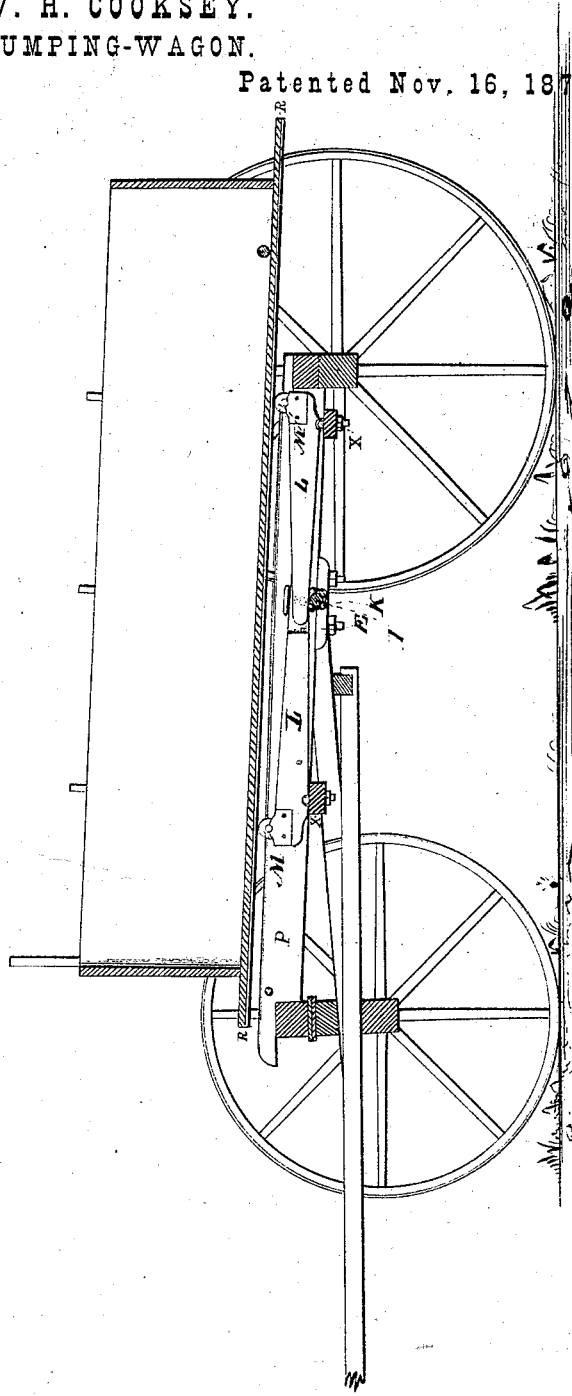

WILLIAM H. COOKSEY, OF WASHINGTON, DISTRICT OF COLUMBIA.

IMPROVEMENT IN DUMPING-WAGONS.

Specification forming part of Letters Patent No. 169,961, dated November 16, 1875; application filed May 12, 1875.

*To all whom it may concern:*

Be it known that I, WILLIAM H. COOKSEY, of Washington city, in the county of Washington and District of Columbia, have invented certain new and useful Improvements in Dumping-Wagons; and I do hereby declare that the following is a full, clear, and exact description thereof, which will enable others skilled in the art to which it pertains to make and use the same, reference being had to the accompanying drawing, and to the letters of reference marked thereon, which form a part of this specification.

The nature of my invention relates to a means for rapidly and easily raising a wagon-body through the medium of levers to throw it from its position on the running-gear, and dump the load upon the ground, as will more fully hereinafter appear.

Figure 1 is a side elevation, the dotted lines showing the position of the body when dumped. Fig. 2 is a plan view of the running-gear with the body removed. Fig. 3 is a longitudinal section, showing rollers, &c.

The letter A is a lever attached to a partially-revolving rod, T, passing through the sills P that the body rests upon, together with hooks A' fitting into staples on each side of the body, holding said body in place to prevent it running back. When the lever A is raised it lifts the hooks out of the staples, and releases the body. The letter B is a lever attached to a partially-revolving rod, V, passing through the sills R of the body, and working a short lever, F, on each side of the body, which raises the tail-gate, as shown in dotted lines in Fig. 1. C is a lever attached to the rod I, around which the chains K are fixed, and by means of which the body, resting on the rollers M, is elevated above the sills P, and then slides back and forth upon the rollers M, as desired. D is a hook bolted to the body of the wagon, said hook catching a small hook, O, on the bolster, and holding the body to the hind axle when dumped. E is a bearing, securely bolted, for rod I, to which the lever C is attached. G is an iron bolted to the sills R of the body, and holding the tail-gate in place, when said tail-gate is not raised. H is a movable standard supporting the tail-gate, and worked by levers B and F, as shown by dotted lines in Fig. 1. I is a partially-revolving rod, passing through the running-gear of the wagon, and worked by lever C, as shown in Fig. 2. K is a chain, which winds around and is fastened to rod I, at one end of the chain, the other end being fastened to, and held by an eye-bolt, which passes through the levers L and plate S. L represents two levers on each side of the running-gear of the wagon, which are worked by lever C, rod I, and chains K, so as to elevate the rollers M, as shown in Figs. 2 and 3. M represents the rollers attached to the levers L, and on which the body runs, when said rollers are elevated, substantially as above described. P represents the sills on which the body of the wagon rests. R represents the sills of the body, which are extended in width so as to cover the rollers M. S is an iron plate holding the levers L in place, by means of a rivet passing through them. T is an iron rod passing through the sills P, and to which the lever A and hooks A', are attached. V is an iron rod passing through the sills R, and to which the levers B and F are attached. X represents two wooden bars crossing through the running-gear of the wagon, fastened to the sills P, and which act as the fulcrums of the levers L.

The sills upon which the box rests slightly incline toward the rear, and the box is held in position by means of hooks A'.

When it is desired to dump the box, the hooks are withdrawn from their eyes by turning the lever A; then, by turning lever C and winding the chains upon rod I, the ends of levers L L, having rollers M M, are raised above the sills, thus supporting the box, which easily rolls down the incline and dumps its contents.

I claim as my invention—

1. The pivoted levers L L, provided with the rollers M M, in combination with chains K, rod I, and lever C, substantially as described.

2. The lever B, and curved arm F, in combination with standards H, moving in vertical guides, and having the end gate hinged thereto, substantially as described.

3. The lever A, in combination with the rod T, and hooks A', substantially as described.

In testimony that I claim the foregoing as my own invention I affix my signature in presence of two witnesses.

WM. H. COOKSEY.

Witnesses:
 J. TYLER POWELL,
 CHAS. E. BISHOP.